US008402292B2

(12) United States Patent
Parikh et al.

(10) Patent No.: US 8,402,292 B2
(45) Date of Patent: Mar. 19, 2013

(54) METHOD AND APPARATUS TO MAXIMIZE POWER OF A COMPUTER SYSTEM FOR EFFECTIVE TESTING

(75) Inventors: Alok Parikh, Mumbai (IN); Amandeep Singh, Fremont, CA (US)

(73) Assignee: Oracle America, Inc., Redwood City, CA (US)

( * ) Notice: Subject to any disclaimer, the term of this patent is extended or adjusted under 35 U.S.C. 154(b) by 485 days.

(21) Appl. No.: 12/580,546

(22) Filed: Oct. 16, 2009

(65) Prior Publication Data

US 2011/0093731 A1    Apr. 21, 2011

(51) Int. Cl.
    *G06F 1/26*    (2006.01)
(52) U.S. Cl. .............. 713/321; 713/320; 714/3; 714/37; 702/182
(58) Field of Classification Search .................. 713/320, 713/321; 714/3, 37; 702/182
    See application file for complete search history.

(56) References Cited

U.S. PATENT DOCUMENTS

| | | | | |
|---|---|---|---|---|
| 5,375,091 A | * | 12/1994 | Berry et al. .................... | 365/201 |
| H1741 H | * | 7/1998 | Cruts ............................. | 714/720 |
| 5,949,724 A | * | 9/1999 | Kang et al. ..................... | 365/201 |
| 7,583,087 B2 | * | 9/2009 | Pilling et al. ................... | 324/522 |
| 7,739,637 B2 | * | 6/2010 | Goodnow et al. ............. | 716/106 |
| 2006/0294408 A1 | * | 12/2006 | Hsiang .......................... | 713/320 |
| 2009/0048801 A1 | * | 2/2009 | Chandra ....................... | 702/120 |

OTHER PUBLICATIONS

Author Unknown, SunVTS Overview, Oracle.com, 2006.

* cited by examiner

*Primary Examiner* — Thuan Du
(74) *Attorney, Agent, or Firm* — Polsinelli Shughart PC (57) ABSTRACT

Implementations of the present invention may involve methods and systems to improve the combined power consumption and thermal response of individual components of a computer system as the components are stressed concurrently during simulation or testing of the system. A group of operating system-level instruction sets for several individual components of the computer system may be designed to stress the components and executed concurrently while power and thermal measurements are taken. The instruction sets may utilize one or more software threads of the computer system or hardware threads such that minimal interference between components occurs as the system is tested. Further, the system components may be partitioned between separate instruction sets. By minimizing the interference between the components while the system is operating, a more accurate power consumption and thermal effect measurements may be taken on the computer system to better approximate the performance of the system.

20 Claims, 8 Drawing Sheets

| Component | Instances | Power Per Instance (W) | Total Power (W) |
|---|---|---|---|
| DIMMs | 64 | 13.5 | 864 |
| CPU | 4 | 325 | 1300 |
| -CPU L2 Cache | 4 | 4.28 | 17.13 |
| -CPU IFU | 4 | 6.49 | 25.97 |
| -CPU FGU | 8 | 2.63 | 22.63 |
| -CPU DCU | 16 | 2.06 | 32.89 |
| -CPU IIU | 16 | 3.35 | 53.58 |
| Memory Controller | 8 | 68.8 | 550 |
| PCI | 8 | 31.3 | 250 |
| SAS/SATA Drive | 1 | 21.3 | 21.3 |
| PCI Switch | 4 | 9.1 | 37 |
| Total | | | 3022 |

| Component | Instances | Power Per Instance (W) | Total Power (W) |
|---|---|---|---|
| CPU | 4 | 325 | 1300 |
| DIMMs | 64 | 13.5 | 864 |
| Memory Controller | 8 | 68.8 | 550 |
| PCI | 8 | 31.3 | 250 |
| PCI Switch | 4 | 9.1 | 37 |
| SAS/SATA Drive | 1 | 21.3 | 21.3 |
| Total | | | 3022 |

METHOD AND APPARATUS TO MAXIMIZE POWER OF A COMPUTER SYSTEM FOR EFFECTIVE TESTING

FIELD OF THE INVENTION

Aspects of the present invention relate to methods for testing of computer systems. More particularly, aspects of the present invention involve a method and system for maximizing power and temperature consumption across a multitude of processors and platforms of a computer system while minimizing interference between the components of the system to attain a more accurate simulation of the system for testing purposes.

BACKGROUND

Modern computer systems often have a multitude of components which operate in conjunction to provide the computing power of the system. However, as computing power of such systems has increased, so too has the overall power consumption and heat generation of the systems. This is especially true in those computer systems specifically designed to run highly intensive workloads, which often result in high levels of power consumed by the system and high operating temperatures. Such extreme conditions may cause the system to malfunction or even incur permanent damage if the power consumed or thermal response gets too high. Thus, most modern computer systems generally require robust thermal design to dissipate the generated heat from the system. It is therefore often necessary during the design or manufacturing of the computer system, to simulate or expose the system to extreme conditions so that any potential issues related to power consumption and high temperature generation which may damage the system are identified before deployment of the computer system.

One common approach to exposing the computer system to extreme power consumption and high thermal values is to operate several functional units within the system concurrently. From an operating system level, this can be achieved by having multiple software algorithms executing in parallel, each targeting a different functional unit to stress that unit to a full extent. However, the task of maximizing stress on multiple components of the system concurrently is not always straight forward. One of the many hurdles is that algorithms working on individual components in the system often interfere with each other due to the interdependence of the components within the system. As a result, when multiple components are targeted concurrently, the power consumption and thermal effect are not necessarily at the maximum for the individual components of the system. In other words, when the computer system is placed under high stress during testing or simulation, the sum total of the power consumed by individual components is generally more than the total system power consumption when these same components are stressed concurrently. This variance in measurable power consumption and thermal response is due to the interdependence of the computer system components when several algorithms are executed concurrently.

To further illustrate this problem, consider two components of a typical computer system; a cache component and a memory component. Power consumed by cache is typically maximized during testing by accessing large portions of the cache in the least time possible and in a sustained manner. Generally, accesses to the cache can be in the form of read and write access using specific data patterns. Similarly, the power consumed by memory is typically maximized by accessing a large number of memory DIMMs and cells of the memory component in the least time possible and in a sustained way. However, when algorithms to stress both memory and cache are executed at the same time, the time available for testing is split across accessing both components together, thus reducing the access bandwidth to individual components as compared to when the entire time is dedicated to testing a single component. Also, all cache accesses may not propagate to memory, thus diluting the stress placed on memory components. In other words, the read and write instructions used to test the memory component will often take more time to complete as the instructions used to test the cache component are executed in parallel. The instructions to stress the cache component will be similarly delayed as the memory component instructions are executed concurrently. As a result, the power and temperature measurements of both the cache and memory components when concurrently targeted is generally lower than when each component is stressed individually. Such interference due to the interdependence of system components is generally applicable across the system architecture when multiples of such components are stressed concurrently.

SUMMARY

One implementation may take the form of a method for testing power consumption and thermal response of a computer system. The method may include the operations of analyzing a computer system architecture to identify one or more components of the computer system that contribute to the overall power consumption of the system and creating one or more instruction sets from operating system-level instructions, where the one or more instruction sets are designed to stress the identified one or more components of the computer system. The method may further include the operations of altering the one or more instruction sets to target particular resources of the computer system such that access interference between the instruction sets is reduced when executing on the computer system during a power consumption and thermal response test.

Another embodiment may take the form of a system for performing a power consumption test of a computer system. The system may comprise at least one processor and a machine-readable storage medium configured to store a computer-executable code. Further, the computer-executable code may, when executed by the processor, cause the system to perform the several operations. Such operations may include analyzing a computer system architecture to identify one or more components of the computer system that contribute to the overall power consumption of the system creating one or more instruction sets from operating system-level instructions, where the one or more instruction sets are designed to stress the identified one or more components of the computer system. The operations may also include altering the one or more instruction sets to target particular resources of the computer system such that access interference between the instruction sets is reduced and executing the instruction sets on the computer system during a power consumption and thermal response test.

Yet another embodiment may take the form of a computer-implemented method for testing a computer system. The computer-implemented method may include the operations of receiving a computer system design, the computer system including a plurality of processing threads, identifying one or more components of the computer system that contribute to the overall power consumption of the computer system and prioritizing the identified one or more components based on the amount of power consumption the one or more components consume. The computer-implemented method may also include the operation of creating one or more instruction sets from operating system-level instructions, where the one or more instruction sets are designed to stress the identified one or more components of the computer system. Further, the method may also include the operation of altering the one or more instruction sets to target particular resources of the computer system such that access interference between the instruction sets is reduced. The computer-implemented method may further include the operations of assigning the one or more instruction sets to execute on the plurality of threads and executing the instruction sets on the plurality of threads.

DETAILED DESCRIPTION

Implementations of the present disclosure may involve methods and systems to increase the combined power consumption and thermal response of individual components of a computer system as the components are stressed concurrently during simulation or testing of the system. To maximize the measured power consumption of the components, a group of operating system-level instruction sets for several individual components of the computer system may be designed to stress the components and executed concurrently while power and thermal measurements are taken. The instruction sets may utilize one or more software threads of the computer system executing on one or more hardware threads to target individual components such that minimal interference between components occurs as the system is tested. Further, the system components may be partitioned between separate instruction sets to further minimize interference between instruction sets (e.g., due to resource contention, CPU pipeline stall, etc.). By minimizing the interference between the instruction sets, higher stress can be applied to multiple components concurrently, thus providing an improved simulation of extreme operating conditions of the system.

Figure 1:
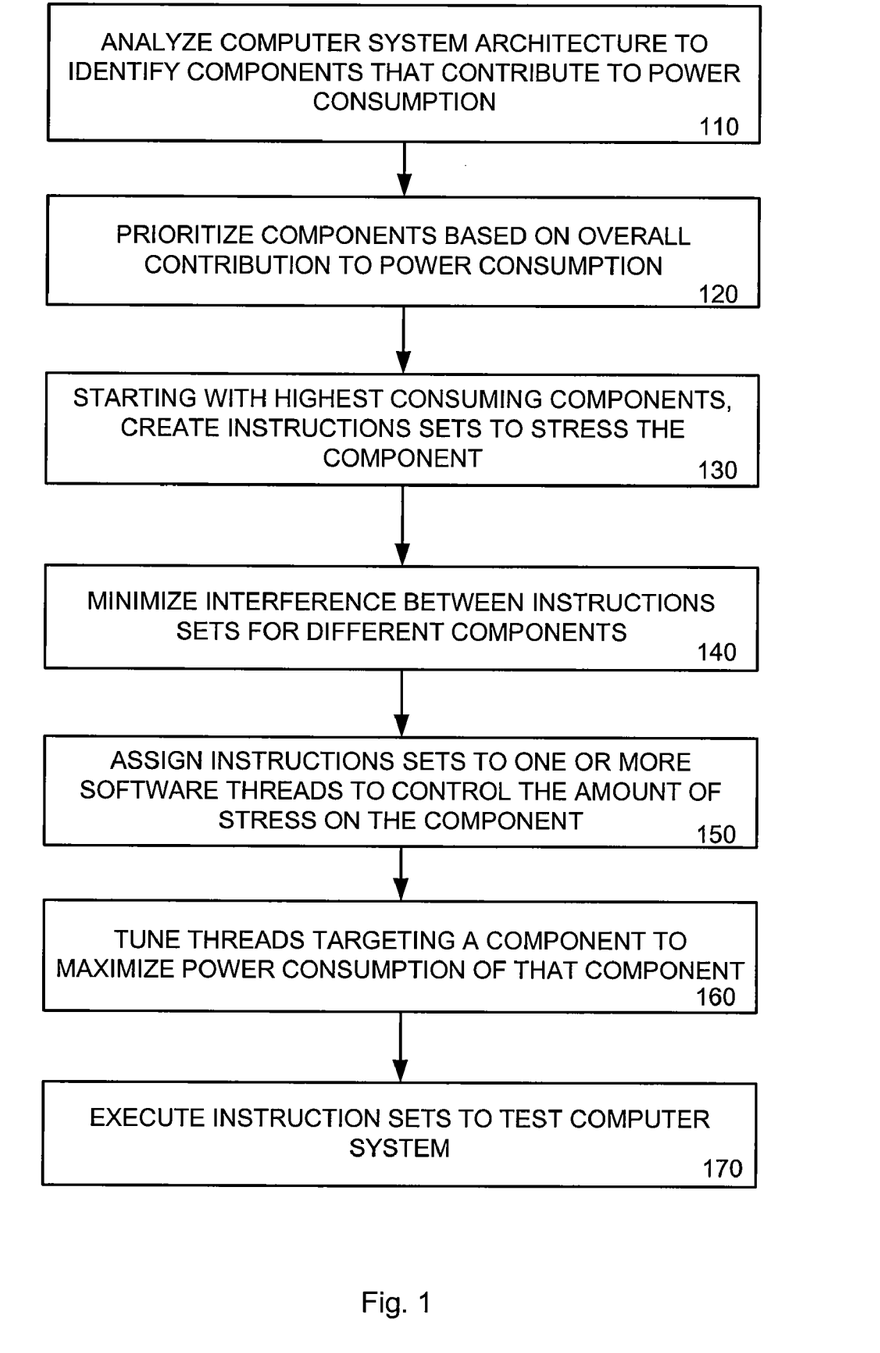
FIG. 1 is a flowchart illustrating a method for creating power testing instruction sets for a computer system platform to minimize interference between components of the computer system to more accurately stress the computer system.

FIG. 1 is a flowchart illustrating a method to increase the power consumption and heat dissipation in a computer system to create adverse operating conditions for the purpose of testing of the computer system. The method may be performed by several machines or apparatuses during the design and manufacture of the computer system. For example, a computer, such as a personal computer or workstation, may perform a simulated power test on a suggested design of the computer system during the design phase of the system. In this example, the computer may approximate the power consumed and heat generated by the many components of the system during the simulated test. In another example, a test control unit may perform the operations described below for testing of a prototype device, such as a system on a chip or processor, during the manufacturing phase. In this example, the testing unit may take power consumption and thermal measurements of the computer system components while the test is executed. In addition, each operation of the described methods may be performed by separate systems of apparatuses at various times during the design and manufacture process of the computer system. Thus, a personal computer may be utilized to perform one or more of the operations described, while a test control unit may perform one or more of the other operations. Generally, any device that may provide an instruction set to a computer system or design to be executed by the system and analyze the resulting power consumption and thermal effect may be utilized to perform the following operations. Further, one or more of the following operations may be performed by an operator or administrator of the test.

Beginning in operation 110, the computer system architecture is analyzed to determine the components of the system that contribute to power consumption of the system. The analysis of the system architecture may be performed in several ways. In one example, a test of the system is performed while measurements of the power consumption of each component of the system is taken to identify which components are contributing to the overall power consumption of the system. In other embodiments, a design of the system is analyzed and compared to a list of known components that contribute to power consumption to identify which components are included in the design of the power maximizing instruction sets. In still another example, a list of high power consuming and heat generating components used to construct the system is maintained by the system designer and provided to the testing unit prior to testing of the computer system.

Figure 2:
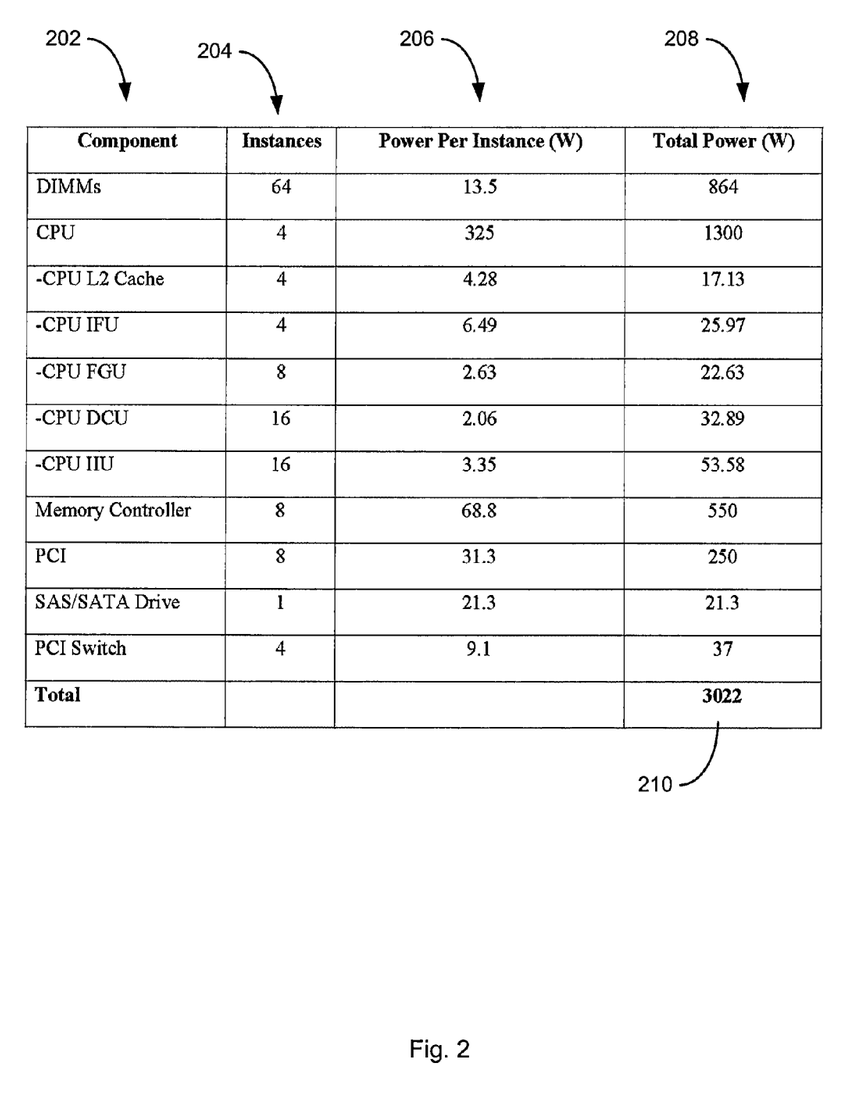
FIG. 2 is a table illustrating an exemplary list of power consuming components of a computer system, including the number of instances of the component in the system as well as the power consumed, in watts, by the component.

FIG. 2 is a table illustrating an exemplary list of power consuming components of a computer system identified in operation 110. The table includes a list of computer system components 202 in a first column, including a list of subcomponents of any one components. For example, the list includes several components that contribute to the overall power consumption of the CPU. In a second column 204, the number of instances of each of the identified components is listed. A third column 206 lists the power consumption of each component per instance, in watts. In a fourth column 208, the total power consumption for each instance of a particular component is listed with a total power consumption 210 provided in the last row of the table. Through this list, the components of the computer system that contribute to the overall system power consumption is identified.

It should be appreciated that the computer systems contemplated herein may include any number and manner of components associated with computer systems. Generally, any electrical component that may aid in the construction and functioning of a computational system is contemplated. Further, computer systems as used herein include any device that comprises one or more electrical components for performing computations, including but not limited to, systems on a chip, processors, memory devices, or any integrated circuit. In addition, the methods described herein may apply to any power distribution system that includes multiple components and consumes power. Also, certain components may not be targeted directly as it may be difficult to target such components programmatically. Instead, these components may be targeted indirectly through other components or combination of threads. For example, several of the components internal to the CPU may not be targeted directly by the method of FIG. 1, but instead are targeted as an overall test of the CPU component. Finally, some components may consume power in the computer system but may not be included in the power consumption test. One example of such components are fans or other mechanical devices of the computer system.

Figure 3:
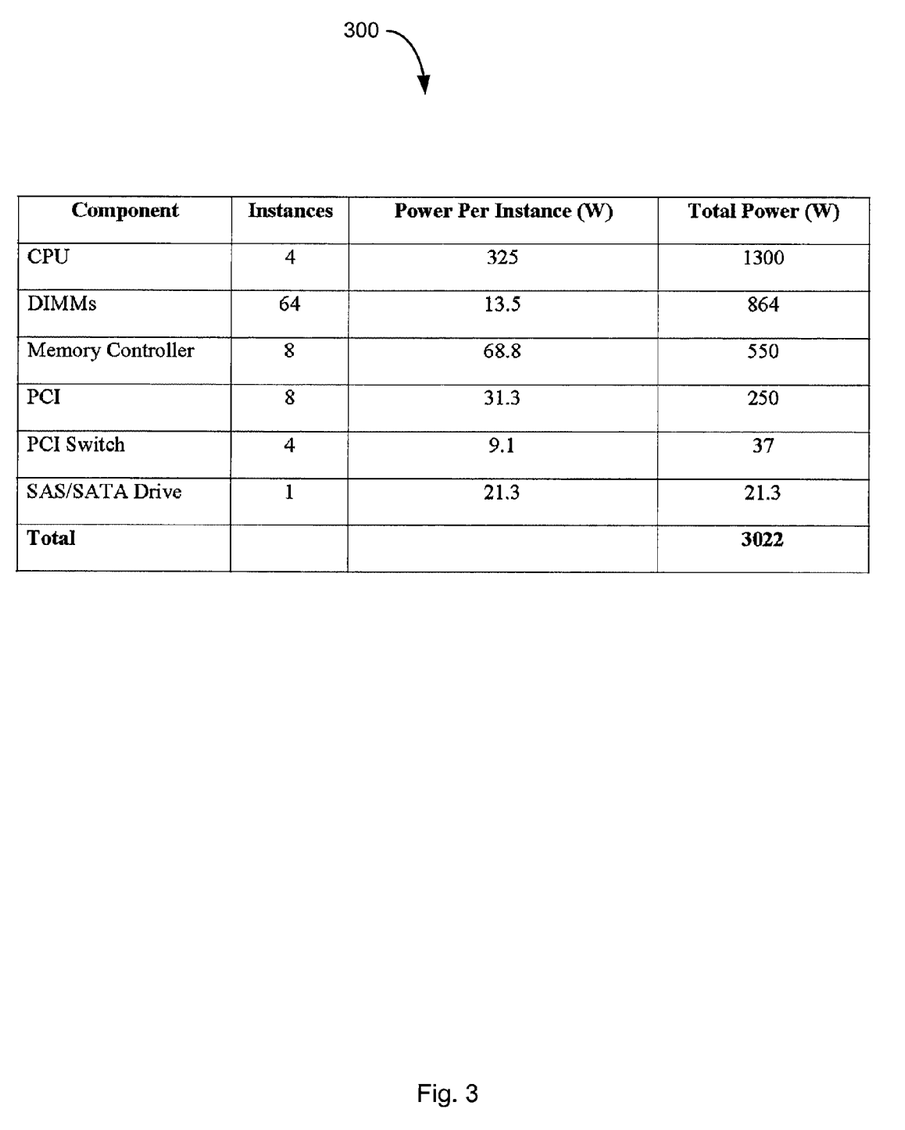
FIG. 3 is a table illustrating a prioritization of the power consuming components of a computer system based on total power consumed.

Returning to FIG. 1, once the architecture of the computer system is analyzed and the power consuming components are identified, the components that contribute to the overall power consumption of the system are prioritized in operation 120. FIG. 3 is a table illustrating a prioritization of the components listed in the table of FIG. 2. The table 300 includes the same columns as the table shown in FIG. 2. In this example, however, the components are prioritized by total power consumed. Further, some components listed in the table of FIG. 2 are not included in the prioritized list 300, namely the subcomponents of the CPU. Instead, such subcomponents are included under the CPU entry of the table 300. However, such subcomponents may be include in the prioritized list as desired. Generally, any component of a computer system that consumes power during operation of the system may be prioritized in this manner. In another embodiment, the components are prioritized based on the thermal response of each component. However, the prioritization of the system components may place the components in any order as desired by the test administrator or testing device.

Figure 4:
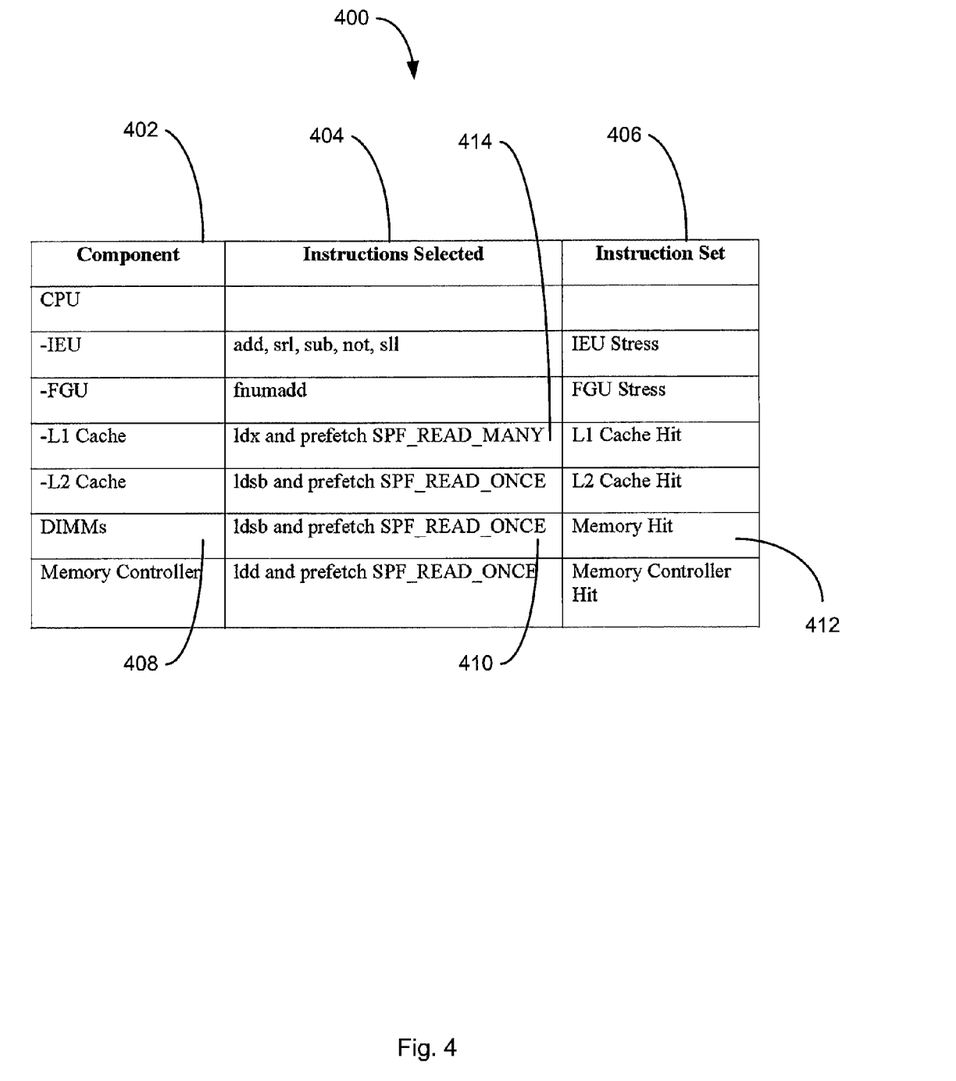
FIG. 4 is a table illustrating one or more software instructions selected to create instructions sets to test the identified components.

Returning to FIG. 1, beginning at the top of the prioritized list, an instruction set is created in operation 130 for each or some of the identified components to stress the power consumption and thermal response of that component. The created instruction sets may comprise a combination of one or more software instructions that target the particular component. For example, FIG. 4 illustrates a table listing one or more software instructions selected to create instructions sets to test the identified components. The table 400 includes a first column 402 listing one or more components from a computer system, identified in operation 110 of FIG. 1. A second column 404 includes one or more software instructions selected to test the listed components in the first column 402 and a third column 406 provides the names given to the set of instructions selected to test the components.

To create the instruction sets (shown in the third column 406) to test the a component of the computer system, the device performing the method may select one or more software instructions 404 designed to test the component. For example, a test control unit performing the power consumption test on a computer system may maintain several software instructions 404 to test certain components of system. Thus, once the components of the system are identified and prioritized, the test control unit may select one or more software instructions 404 to combine to form an instruction set 406 to stress each component. In one example, a memory component 408 is identified as consuming power within the computer system. To test the memory component 408, one or more software instructions 410 may be selected that perform several read and write commands to the memory component in a short amount of time. When executed, the instructions 410 place the component 408 under stress such that an approximate maximum power consumption and thermal response of the component may be measured. These instructions may be combined into an instruction set 412 designed to be executed by the computer system during testing. Here, the instruction set 412 for the memory component is labeled "Memory Hit." In this manner, the instruction sets 406 created to test the components of the computer system are created from one or more stored instructions 404. Generally, each created instruction set 406 is created by combining one or more instructions 404 to test an individual component of the computer system. However, it should be appreciated that the instruction sets 406 may include any number of instructions 404 to test any number of components 402 of the computer system.

Similar to the example above concerning the memory component 408, instructions 404 for other components may also be selected in operation 130 for inclusion in the created instruction sets to stress those components. For example, instructions 414 to read and write to a cache may stress a cache component while computational instructions may be used to stress a processor. Also, several instruction sets may be created to target subcomponents of the computer system. For example, instruction sets created to test a CPU component may include instructions sets to test the CPU IEU and FPU, labeled in the table of FIG. 4 as "IEU Stress" and "FGU Stress." In addition, several considerations may be taken into account when selecting the proper instructions for each identified component, such as component architecture. For example, a 64-bit register may be identified as a component of the system. To stress the register, an instruction that provides 64 bits to the register may be selected. Similarly, instructions which target a group of registers together thus providing 64-byte access by executing the instruction once may also be used. Smaller byte words, such as an 8-byte instruction, may not provide high power consumption as the 64-byte instruction. In another example, the amount of time to execute a set of instructions may be considered. Instructions that take longer to execute may not be as desirous as those instructions that execute in less time. Generally, any instruction or set of instructions that maximizes the operation and utilization of a component may be combined into an instruction set in operation 130 to stress the component for power consumption and thermal testing.

The software instructions 404 of each instruction set 406 are typically designed to stress a component of the computer system in isolation. In other words, the instruction sets 406 are designed to stress each targeted component individually while no other component is interfering with those instructions. As such, the instruction set 406 being executed for one component may interfere with the execution of other instruction sets operating concurrently, thereby providing a less than optimal test of the power consumption and thermal response of the components of the system.

Returning to FIG. 1, to reduce interference between the instruction sets executed by the computer system, the instructions comprising the instruction sets may be altered in operation 140 to partition the system resources utilized or accessed by each executing instruction set. Partitioning and dedicating system resources to separate instruction sets may limit the contention for such resources between concurrently executing instructions. As a result, interference between the executing instruction sets may be minimized and a more accurate power consumption and thermal response test of the components may be performed. Several embodiments of resource partitioning are explained in more detail below with reference to FIGS. 5-7.

Once the interference between the instruction sets has been minimized through resource partitioning, each instruction set targeting a system component may be assigned to one or more software and hardware threads for execution by the computer system in operation 150. For example, based on the software instructions that comprise the instruction sets, the one or more instruction sets may be assigned to one or more software threads for execution. Further, some computer systems have multiple hardware threads depending on the system hierarchy, i.e. a computer system may have several processors each with several cores per processor. Each core of the computer system may be considered a hardware thread such that one or more software threads may be bound to each core of the system. By executing one or more software threads comprising the instruction sets on every hardware thread of the computer system, each power consuming resource may be fully utilized such that power consumption and thermal response may be measured. In general, a group of instructions sets are assigned to one or more software threads to ensure that each component of the computer system being tested has the proper intensity or number of software instructions executed to test that component. To ensure coverage of every component under test, the software threads are then distributed across the one or more hardware threads. It should also be noted that, for some components, it is not required that an instruction set be executed on each identified thread. Rather, some components may only access a few or one thread to perform the power consumption test.

In addition, some components of the system may be shared by the several hardware threads of the system. Thus, although some components of the system are partitioned in operation 140, other components may not be partitioned to one instruction set or another. For example, a floating point unit (FPU) of a processor may by shared by four hardware threads. Thus, instruction sets executing on the four strands may interfere if each instruction set attempts to access the FPU at the same time. Thus, aside from assuring that each hardware thread is executing an instruction set, some consideration may also be given to the particular instructions of each instruction set such that there is minimal or no interference between the executing instructions for the use of a component. In the example above, one instruction set may be assigned to a hardware thread to test the shared FPU while the other three strands tied to the FPU may execute instruction sets such that the FPU is not accessed at all or only accessed minimally. Thus, the instruction sets executing on the four strands sharing the FPU may minimize the interference between the executing instructions.

Other factors may also be considered to determine which instruction set is assigned to which software and hardware threads in the computer system. For example, an instruction set may be created that targets components that require a small number of clock cycles to execute, such as integer execution units (IEU) or L1 caches. Other components may take several clock cycles to execute the software instructions, such as read and write commands to a memory. Because the computer system architecture is known, the latency of each executing instruction set may be considered by the testing unit to ensure that no component sits idle for several clock cycles. The long latency and short latency instructions may even be mixed and executed on the same hardware thread to prevent the components of that thread from becoming idle. Thus, the instruction sets may be assigned to the different software and hardware threads of the computer system in such a way that each hardware thread maintains a steady stream of executing instructions. As mentioned above, a more accurate stress test of a component of a computer system is achieved when the instructions of an instruction set is executed in a short period of time. Thus, by analyzing the architecture of the computer system in relation to the executing instructions of the instruction sets, the instruction sets may be assigned to the threads of the computer system such that each component of the computer system is fully utilized.

The assigning of the instruction sets to the threads of the system may also provide the ability for a testing unit to duty cycle the power consumption and temperature response at a component or system level. Because an instruction set may be assigned to target a specific component or group of components, a duty cycling of that component or group may be performed by the testing unit. Duty cycling of a component may generate spikes in power consumption and thermal response, thus putting the components under even higher stress. Such testing may be useful to discover other faults of the system design or manufacture.

In operation 160, the software threads may be further tuned to maximize the utilization of a component. For example, once the instruction sets are assigned to threads in operation 150, an analysis of the components targeted and utilized by each instruction set may be conducted. Some components, such as an IEU or FPU of a processor, may be fully utilized using a single software thread. Other components, such as memory, may require more than one executing software thread to maximize the usage of that component. Thus, each instruction set may be analyzed to determine which component is targeted by that instruction set. This information may allow the software threads to be tuned to ensure that each component is fully stressed during testing. For example, after analyzing the instruction sets, it may be discovered that only one software thread is executing an instruction set to test the memory component. In this case, one or more additional threads may be assigned to execute the memory testing instruction set such that the memory component is fully utilized. However, the assignment of one or more threads to target the memory component may remove instruction sets targeting other components. Thus, as each thread is assigned or reassigned a new instruction set, an analysis of each thread may be conducted to ensure that each component is targeted and that there is minimal interference between the executing instruction sets. In this manner, each thread may be tuned to ensure that each component is fully tested.

Finally, in operation 170, the instruction sets may be executed by the computer system while power consumption and thermal response measurements are taken. Because the above operations have limited the interference between the components of the system while the instruction sets are executing concurrently, the testing and the measurements taken during testing may provide a more accurate portrayal of the upper power and thermal limit of the computer system. Thus, a computer system design or manufacture may be more robust and more reliable when provided to a customer.

In addition, the above described operations may be repeated to further tune the power and thermal results obtained from the test. For example, the results obtained during operation 170 may be analyzed to determine the overall power consumption and thermal response of the computer system. Upon analysis, the above operations may be repeated to further tune the instruction sets, memory assignments and instruction set distribution to obtain a more accurate result of the extreme system conditions.

As mentioned above in operation 130, instruction sets comprising instructions may be created to target and stress several components of a computer system. However, these instructions, when executed concurrently, may degrade the power consumption measurements taken during stress testing. For example, an instruction set may include read and write requests to a memory component to fully utilize that component during testing. To access the memory, the computer system generally stores the contents sent to or received from the memory in a cache as part of the read and write instructions. As long as only the single instruction set is executed, the memory may be fully taxed such that an upper limit of power consumption and thermal response may be measured. However, if a second instruction set is executing concurrently that also accesses the cache being used by the memory, an interference of the cache usage occurs. In this situation where the execution of instructions interferes within a component, the stressing of another component may be degraded. Thus, the memory component may not be fully tested because the instruction set designed to stress the memory may have to wait until the cache is clear before executing its commands.

Figure 5:
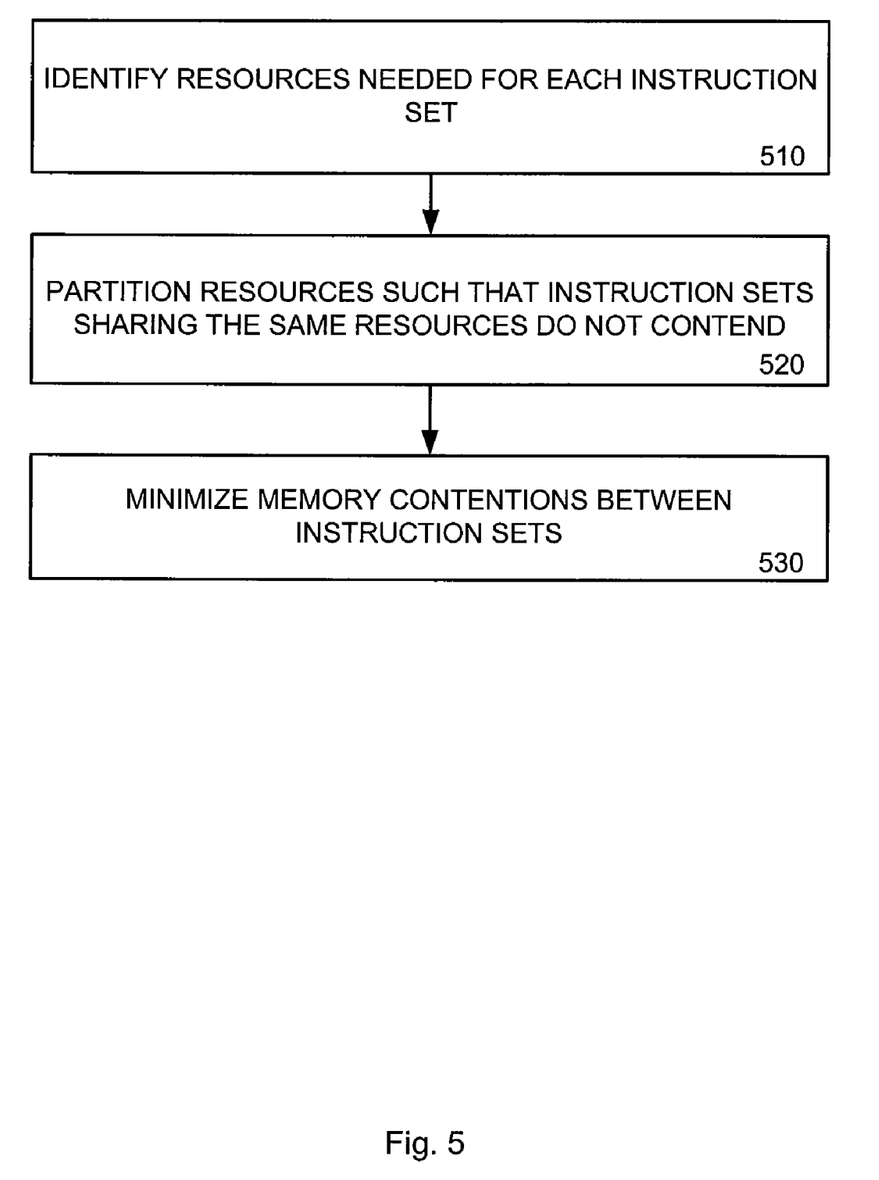
FIG. 5 is a flow chart illustrating a method for partitioning resources of a computer system between one or more executing instruction sets designed to stress the components of the system.

To minimize this interference, several steps may be taken in operation 140 of FIG. 1. One such method is described below in reference to FIGS. 5 through 7. FIG. 5, in particular, is a flow chart illustrating a method for partitioning resources of a computer system between one or more executing instruction sets designed to stress the components of the system. By partitioning the system resources between executing instruction sets, contention and hence interference between instruction sets for use of a particular component of the system may be reduced or eliminated.

Beginning in operation 510, the test control unit or testing computer performing a power consumption test on the computer system may identify the computer system resources needed for each executing instruction set. For example, an instruction set may be created to test a memory component of a computer system. To access and stress the memory component, the instruction set may include instructions that access several other resources as part of the testing of the memory component, such as execution units, registers and caches. Each of these components may be utilized by the instructions of the instruction set to stress the memory component. Thus, each instruction set may create a trail of resources that the instruction set may access to perform the instructions for a particular component. This trail may be utilized by the testing unit to partition the resources between the executing instruction sets.

After the trail for each instruction set is identified, the computer system resources may be partitioned in response to maintain separation for each of the executing instruction sets in operation 520. The partitioning of resources is explained in more detail with reference to FIG. 6. Further, the memory of the computer system may also be partitioned into groups and assigned to each instruction set that accesses the memory component in operation 530. Assigning memory groups to separate instruction sets may also reduce interference between executing instruction sets. The division of memory between instruction sets is explained in more detail below with reference to FIG. 7.

Figure 6:
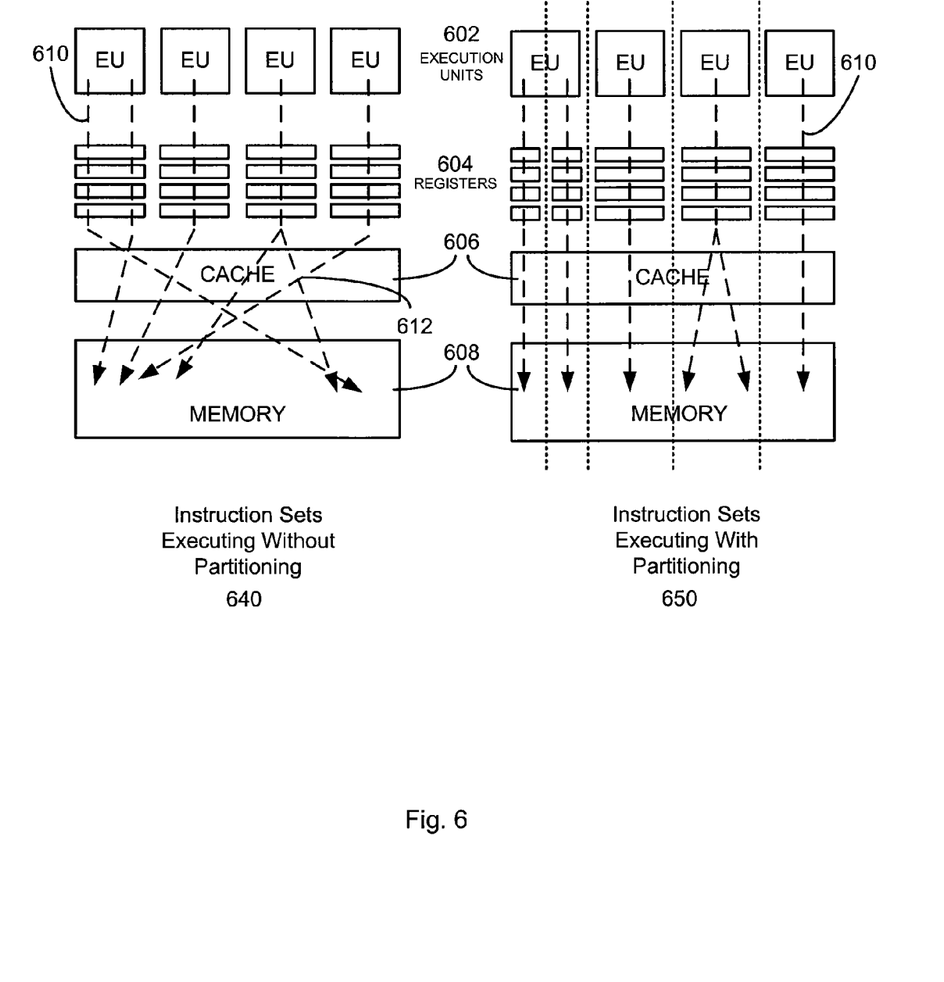
FIG. 6 is a diagram illustrating partitioning of registers, cache and memory of a computer system between separate executing instruction sets.

FIG. 6 is a diagram illustrating partitioning of several resources of a computer system into separate executing instruction sets. While the diagram illustrates several particular computer system resources, it should be appreciated that resource partitioning may be applied to any component of the computer system that may be accessed by an executing instruction set.

Several resources of the computer system are illustrated in FIG. 6, namely execution units 602, registers 604, caches 606 and memory 608. Each of the illustrated resources may be utilized by a computer system to execute an instruction set to test the memory component for power consumption and thermal response. In addition, several paths 610 representing several executing instruction sets are also illustrated. Thus, each execution unit 602 is the beginning point for one or more executing instruction sets. In the resources illustrated on the left 640 of FIG. 6, no partitioning of the resources has occurred such that the instruction sets may access any of the available resources and interference between the executing instruction sets may occur. The resources illustrated on the right 650 include the same resources as in example 640 with the same executing instruction sets 610. However, in this example 650, the resources are partitioned between the executing instruction sets 610 such that no or little interference occurs between the executing instruction sets.

As shown, each execution unit 602 is executing the instructions from one or more instruction sets 610. These instructions may also access one or more registers 604, caches 606 and memory 608 locations during the execution of the instruction sets. However, without partitioning, such access may overlap or interfere, as shown in example 640. For example, two executing instruction sets 610 may access the same location in cache (illustrated in FIG. 6 as location 612) while attempting to write data to the memory component 608. Thus, during execution, one instruction set 610 must wait until the data from the first instruction set has exited from the cache 606 before it can place its own data into the cache. Similar interferences may occur in the registers 604 or in memory 608. As explained above, such interferences within a component of the system may reduce the effectiveness of a stress test for one or more of the components utilized by the executing instruction sets 610.

To reduce this interference, the computer system resources may be partitioned between the concurrently executing instruction sets 610. Thus, as illustrated in the partitioned resources example 650, each instruction set executes within the resources set out for that instruction set with minimal interference with other executing instruction sets. As shown, each instruction set 610 accesses the same area in the registers 604, cache 606 and memory 608 components, with no overlap occurring with other instruction sets. Thus, the resources accessed by any given instruction set 610 may be dedicated to that instruction set so that only that instruction set is utilizing the resource at any given time. In this manner, the interference between the instruction sets is reduced and a more accurate power consumption and thermal response measurement may be acquired.

To partition each resource, the instructions of the instruction set 610 may be written to specifically target a particular resource or a particular area within the resource. For example, the instructions of a particular instruction set 610 may include instructions to access a particular set of registers 604 as needed for the instruction set. These registers 604 may be dedicated to that particular instruction set 610 such that other executing instruction sets may not access the dedicated registers. Similarly, the instruction set 610 may be created to access only a particular area of cache or memory during execution. The partitioning of memory is explained in more detail below with reference to FIG. 7. Thus, by altering the instructions of each instruction set 310 to access certain resources or areas of resources, such resources may be free to execute the instructions of the dedicated instruction set with minimal interference from other executing instruction sets.

Figure 7:
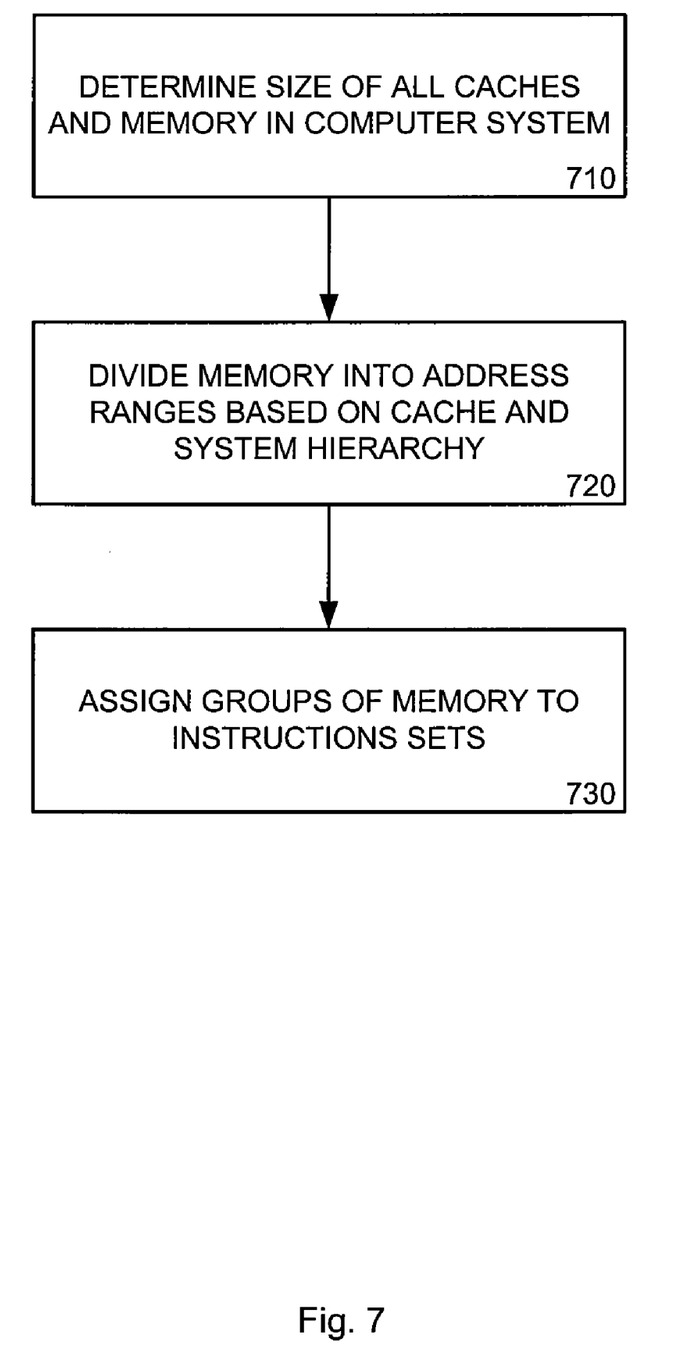
FIG. 7 is a flowchart illustrating a method for partitioning memory among a plurality of executing instruction sets to reduce interference of memory access between the instruction sets.

In addition to partitioning the resources of the computer system between the instruction sets, particular areas of memory may also be partitioned amongst the instruction sets. FIG. 7 is a flow chart illustrating a method for partitioning memory among a plurality of executing instruction sets to reduce interference of memory access between the instruction sets. The method of FIG. 7 may be utilized as an operation of FIG. 5 (such as operation 530) to minimize the interference of executing instruction sets in a computer system to provide a more accurate stress test for power consumption and thermal response testing.

To begin dividing the memory component between the executing instruction sets, the testing unit or other computer device may determine the size of all caches and memory in a computer system under test in operation 710. This information may be derived from an analysis of the computer system architecture, similar to operation 110 of FIG. 1. Generally, this information may be determined by the testing system through an analysis of the computer system under test or may be provided with such information through a design file. In operation 720, the memory may be divided into portions based on the information derived in operation 710. For example, a computer system may have 20 cache configurations for a particular memory component. In operation 720, the memory may be divided into 20 portions, one for each cache configuration. The division of the memory may be accomplished by assigning or otherwise associating certain address ranges within the memory to specific cache configurations. Thus, a first section of memory defined by the memory addresses may be associated with a first cache configuration while a second set of memory addresses defining a range may be associated with a second cache configuration.

Generally, each address range defining the divisions of memory is similar in size. However, it should be appreciated that the memory divisions may be any size and may vary from division to division. Further, the size of each division of the memory may be in response to the overall computer system hierarchy and design. For example, certain sets of components of the system may not require a substantial section of memory to operate. In operation 720, these sets of components may be assigned a smaller address range of memory to execute the instructions testing that set. Other sets may require more memory space, thus a larger set of address ranges may be assigned to those sets of components. Generally, the division technique and size of each division of the memory may take any form that dedicates certain portions of the memory based on the system architecture.

Once the memory is divided in operation 720, the separate memory sections may be assigned to the instruction sets created to test the computer system in operation 730. Similar to the division of the memory, the dedicated sections of memory may be assigned to the instruction sets so that each instruction set accesses the same size of memory or the sections may be assigned after considering the anticipated usage of the memory. For example, one instruction set may be created to stress a group of registers within the computer system. This instruction set may require only a small section of memory to execute the instructions. Thus, the section of memory assigned to this instruction set may be small. On the other hand, an instruction set created to test the memory component may require a substantial amount of memory space. In this example, the section of memory dedicated to this instruction set may be quite large. Generally, the divided sections of memory may be assigned to the instruction sets to stress the components of the system while minimizing the interference between the executing instruction sets.

Assignment of the memory groups to the executing instruction sets may occur by altering the instructions of the instruction sets such that the instructions target a specific area of memory. For example, the instructions may be altered to include the exact range of assigned memory for that instruction set. In other embodiments, the instructions of the instruction set may be altered such that the instructions access a certain group of caches or registers, which in turn are structured to only access certain memory components or sections of memory. Thus, by limiting the caches or registers available to an executing instruction set, that instruction set may be limited to a specifically assigned memory location for execution. Generally, any method to assign memory areas to a particular executing instruction set is contemplated herein.

As should be appreciated, by dedicating certain sections of memory to the executing instruction sets, the possibility of the instruction sets overlapping or attempting to access the same space in memory is reduced. Minimizing the amount of interference between the instruction sets within the memory space, the instruction sets may better stress the components of the computer system to obtain a more accurate depiction of the power consumption and thermal response of the system.

Figure 8:
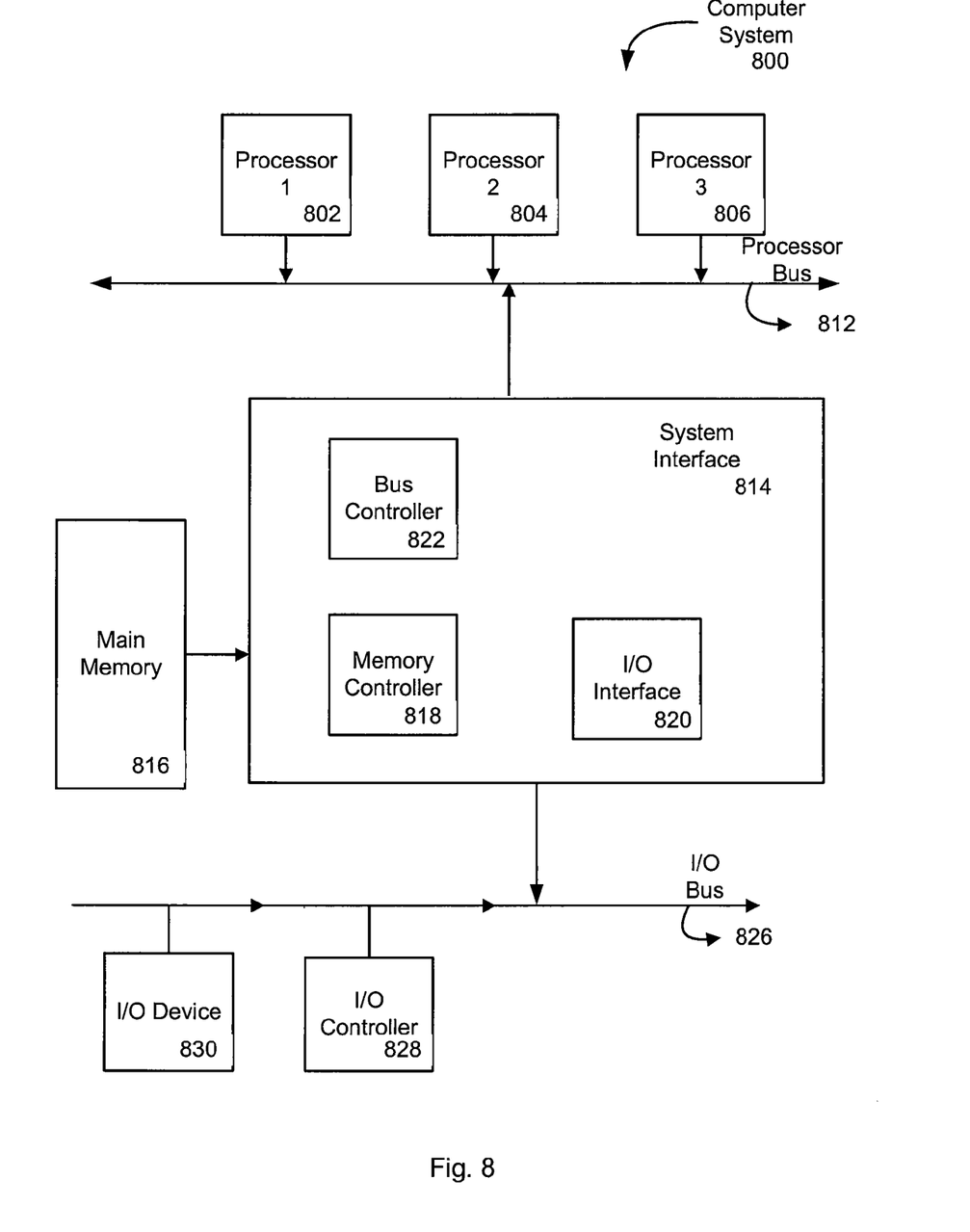
FIG. 8 is a block diagram illustrating an exemplary computer system which may be used in implementing embodiments of the present disclosure.

FIG. 8 is a block diagram illustrating an example of a computer system 800 which may be used in implementing embodiments of the present invention. The computer system (system) includes one or more processors 802-806. Processors 802-806 may include one or more internal levels of cache (not shown) and a bus controller or bus interface unit to direct interaction with the processor bus 812. Processor bus 812, also known as the host bus or the front side bus, may be used to couple the processors 802-806 with the system interface 814. System interface 814 may be connected to the processor bus 812 to interface other components of the system 800 with the processor bus 812. For example, system interface 814 may include a memory controller 818 for interfacing a main memory 816 with the processor bus 812. The main memory 816 typically includes one or more memory cards and a control circuit (not shown). System interface 814 may also include an input/output (I/O) interface 820 to interface one or more I/O bridges or I/O devices with the processor bus 812. One or more I/O controllers and/or I/O devices may be connected with the I/O bus 826, such as I/O controller 828 and I/O device 830, as illustrated.

I/O device 830 may also include an input device (not shown), such as an alphanumeric input device, including alphanumeric and other keys for communicating information and/or command selections to the processors 802-806. Another type of user input device includes cursor control, such as a mouse, a trackball, or cursor direction keys for communicating direction information and command selections to the processors 802-806 and for controlling cursor movement on the display device.

System 800 may include a dynamic storage device, referred to as main memory 816, or a random access memory (RAM) or other devices coupled to the processor bus 812 for storing information and instructions to be executed by the processors 802-806. Main memory 816 also may be used for storing temporary variables or other intermediate information during execution of instructions by the processors 802-806. System 800 may include a read only memory (ROM) and/or other static storage device coupled to the processor bus 812 for storing static information and instructions for the processors 802-806. The system set forth in FIG. 8 is but one possible example of a computer system that may employ or be configured in accordance with aspects of the present disclosure.

According to one embodiment, the above techniques may be performed by computer system 800 in response to processor 804 executing one or more sequences of one or more instructions contained in main memory 816. These instructions may be read into main memory 816 from another machine-readable medium, such as a storage device. Execution of the sequences of instructions contained in main memory 816 may cause processors 802-806 to perform the process steps described herein. In alternative embodiments, circuitry may be used in place of or in combination with the software instructions. Thus, embodiments of the present disclosure may include both hardware and software components.

A machine readable medium includes any mechanism for storing information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 816. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It should be noted that the flowcharts of FIGS. 1, 5 and 7 are illustrative only. Alternative embodiments of the present invention may add operations, omit operations, or change the order of operations without affecting the spirit and scope of the present invention.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method for testing power consumption and thermal response of a computer system comprising:
analyzing a computer system architecture to identify one or more components of the computer system that contribute to the overall power consumption of the system;
creating one or more instruction sets from operating system-level instructions, the one or more instruction sets designed to stress the identified one or more components of the computer system;
altering the one or more instruction sets to target particular resources of the computer system such that access interference between the instruction sets is reduced; and
executing the instruction sets on the computer system during a power consumption and thermal response test.

2. The method of claim 1 further comprising:
prioritizing the identified one or more components based on the amount of power consumption the one or more components consume.

3. The method of claim 1 further comprising:
analyzing the computer system architecture to identify the number of hardware threads present on the computer system; and
assigning the one or more instruction sets to the identified hardware threads.

4. The method of claim 3 further comprising:
analyzing the one or more instruction sets to determine the one or more components of the computer system accessed by each of the instruction sets; and
reassigning the one or more instruction sets to the identified hardware threads if it is determined that each of the one or more identified components are not accessed by the instruction sets.

5. The method of claim 1 wherein the altering operation comprises:
analyzing the computer system architecture to identify a trail of resources accessed by each of the one or more instruction sets during execution; and
partitioning the identified resources to the instruction sets based on the trail of resources that are accessed by each of the one or more instruction sets.

6. The method of claim 5 wherein the partitioning operation further comprises:
analyzing the computer system architecture to determine the size of available memory in the computer system;
dividing the memory into address range groups based on the number of the one or more instruction sets; and
assigning the address range groups to the one or more instruction sets.

7. The method of claim 6 wherein the assigning operation comprises altering the operating system-level instructions of the one or more instruction sets to only access the address range group assigned to the particular instruction set.

8. The method of claim 1 wherein the operating system-level instructions are maintained as a list of available instructions for stressing the one or more components of the computer system.

9. The method of claim 1 further comprising:
measuring the power consumption and thermal response of the one or more components during the test.

10. A system for performing a power consumption test of a computer system comprising:
at least one processor; and
a machine-readable storage medium, the machine-readable storage medium storing a computer-executable code that, when executed by the processor, causes the system to perform the operations of:
analyzing a computer system architecture to identify one or more components of the computer system that contribute to the overall power consumption of the system;
creating one or more instruction sets from operating system-level instructions, the one or more instruction sets designed to stress the identified one or more components of the computer system;
altering the one or more instruction sets to target particular resources of the computer system such that access interference between the instruction sets is reduced; and
executing the instruction sets on the computer system during a power consumption and thermal response test.

11. The system of claim 10, wherein the computer-executable code further causes the processor to further perform the operation of:
prioritizing the identified one or more components based on a prioritization criteria provided by a test administrator.

12. The system of claim 10, wherein the computer-executable code further causes the processor to perform the operation of:

analyzing the one or more instruction sets to determine the one or more components of the computer system accessed by each of the instruction sets; and reassigning the one or more instruction sets to the identified hardware threads if it is determined that each of the one or more identified components are not accessed by the instruction sets.

13. The system of claim 12, wherein the computer-executable code further causes the processor to perform the operation of:

analyzing the computer system architecture to identify a trail of resources accessed by each of the one or more instruction sets during execution; and partitioning the identified resources to the instruction sets based on the trail of resources that are accessed by each of the one or more instruction sets.

14. The system of claim 13, wherein the computer-executable code further causes the processor to perform the operation of:

analyzing the computer system architecture to determine the size of available memory in the computer system;

dividing the memory into address range groups based on the number of the one or more instruction sets; and assigning the address range groups to the one or more instruction sets.

15. The system of claim 10, wherein the computer-executable code further causes the processor to perform the operation of:

measuring the power consumption of the one or more components during the power consumption test.

16. A computer-implemented method for testing a computer system comprising:

receiving a computer system design, the computer system including a plurality of processing threads;

identifying one or more components of the computer system that contribute to the overall power consumption of the computer system;

prioritizing the identified one or more components based on the amount of power consumption the one or more components consume;

creating one or more instruction sets from operating system-level instructions, the one or more instruction sets designed to stress the identified one or more components of the computer system;

altering the one or more instruction sets to target particular resources of the computer system such that access interference between the instruction sets is reduced;

assigning the one or more instruction sets to execute on the plurality of threads; and executing the instruction sets on the plurality of threads.

17. The computer-implemented method of claim 16 wherein the altering operation comprises:

analyzing the computer system architecture to identify a trail of resources accessed by each of the one or more instruction sets during execution; and partitioning the identified resources to the instruction sets based on the trail of resources that are accessed by each of the one or more instruction sets.

18. The computer-implemented method of claim 17 wherein the partitioning operation further comprises:

analyzing the computer system architecture to determine the size of available memory in the computer system;

dividing the memory into address range groups based on the number of the one or more instruction sets; and assigning the address range groups to the one or more instruction sets.

19. The computer-implemented method of claim 18 wherein the assigning operation comprises altering the operating system-level instructions of the one or more instruction sets to only access the address range group assigned to the particular instruction set.

20. The computer-implemented method of claim 16 further comprising:

instructing a test control unit to measure the power consumption and thermal response of the one or more components while the instruction sets are executed on the plurality of threads.

* * * * *